United States Patent [19]
Hiraoka et al.

[11] Patent Number: 5,215,825
[45] Date of Patent: Jun. 1, 1993

[54] POLYESTER FILM AND PHOTOSENSITIVE MATERIAL

[75] Inventors: Toshihiko Hiraoka, Otsu; Kenji Tsunashima, Kyoto; Masaru Suzuki, Ito; Takashi Mimura; Hirokazu Kurome, both of Otsu, all of Japan

[73] Assignee: Toray Industries, Inc., Japan

[21] Appl. No.: 809,867

[22] Filed: Dec. 18, 1991

[30] Foreign Application Priority Data

Dec. 21, 1990 [JP] Japan .................................. 2-405258
Dec. 28, 1990 [JP] Japan .................................. 2-408689
Dec. 28, 1990 [JP] Japan .................................. 2-408698
Jan. 9, 1991 [JP] Japan ...................................... 3-1030

[51] Int. Cl.$^5$ .............................................. B32B 27/36
[52] U.S. Cl. ..................................... 428/480; 528/272; 528/275; 528/295; 528/301; 528/302; 528/308; 428/364; 430/495
[58] Field of Search ............... 528/272, 275, 295, 301, 528/302, 308; 428/364, 480; 430/495

[56] References Cited

U.S. PATENT DOCUMENTS 4,217,441  8/1980  Bayless ............................... 528/293
4,241,170 12/1980  Bayless ............................... 430/533

FOREIGN PATENT DOCUMENTS 1-244446 9/1989 Japan .

OTHER PUBLICATIONS

"Plastics Films" J. H. Briston, Third Edition, pp. 52-53.
"New and Speciality Films, II," Sep., 1986.
"The Science and Technology of PolymerFilms", vol. II, Edited by Orville J. Sweeting, pp. 587-593.

*Primary Examiner*—Morton Foelak
*Assistant Examiner*—Sam A. Acquah
*Attorney, Agent, or Firm*—Austin R. Miller

[57] ABSTRACT

A polyester film comprising a polyester whose dicarboxylic acid copolymerized component contains (i) an aromatic dicarboxylic acid having a metal sulfonate and/or a derivative thereof and (ii) a polyetherdicarboxylic acid represented by the following chemical formula (a) and having a mean molecular weight in the range of 600 to 20000 and/or a derivative thereof.

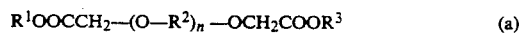

$$R^1OOCCH_2-(O-R^2)_n-OCH_2COOR^3 \qquad (a)$$

Where, "$R^1$" and "$R^3$" are H or alkyl groups each having a carbon number of 1 to 8, "$R^2$" is alkylene group having a carbon number of 2 to 8 and "n" is a positive integer. The polyester film has excellent transparency, mechanical properties and dimensional stability such as those of a PET film and an excellent water absorption property such as that of a TAC film.

Therefore, when the film is used as a base film for a photosensitive material, a good curl-extinguishing property as well as good transparency, mechanical properties and dimensional stability of the material can be realized.

13 Claims, No Drawings

POLYESTER FILM AND PHOTOSENSITIVE MATERIAL

BACKGROUND OF THE INVENTION

1. Field of the Invention

The present invention relates to a polyester film and a photosensitive material using the same, and more particularly to a copolymerized polyester film which has excellent transparency, water absorption and mechanical properties and a photosensitive material using the polyester film as a base layer or a cover layer thereof.

2. Description of the Prior Art

There are a sheet type material such as an X-ray film, an engraving film or a cut film and a roll type material (roll film) as a photosensitive material. A typical roll film is a color or black-and-white negative film enclosed in a cartridge with a width of 35 mm or smaller than 35 mm and used for a camera.

A photosensitive material is generally produced by coating at least one photosensitive layer on a plastic base film. A fibrous polymer represented by triacetyl cellulose (hereinafter, referred to as "TAC") and a polyester polymer represented by polyethylene terephthalate (hereinafter, referred to as "PET") are used for this plastic base film, as shown in, for example, "Plastic Films, Third edition, page 52, J. H. Briston, (1989)" and "The Science and Technology of Polymer Films, Volume II, page 588–592, Orville J. Sweeting, (1971)".

TAC film is made by solution film formation using methylene chloride as a main solvent. TAC film has a small optical anisotropy, and excellent transparency and flatness. Further, since TAC film has an appropriate water absorption property, it indicates an excellent curl-extinguishing property after processing. Namely, although a curl is generated in the film by keeping the film in a state of a roll formation for a certain period of time, the manoeuverability of the molecule chain in the film increases by the water absorption in processing of the film, and the molecule chain which has been fixed in the state of roll formation is rearranged by the enhanced motion, thereby extinguishing the curl.

In contrast, in a photosensitive material using a film which does not have such a curl-extinguishing property, if the material is used in the form of a roll, troubles such as generation of scratches, blooming of focus, or jamming in carrier process occur in a printing process wherein a picture image is formed on a photographic paper after processing. Therefore, TAC film, which does not cause such troubles, has been broadly used as a photosensitive material.

However, recently the requirements for photosensitive materials have been diversely extended. Particularly, properties capable of following a high-speed unwinding of a roll film in photographing, a high magnification in printing and slide projection, and a property applicable to a miniaturized camera have been strongly required. Therefore, characteristics such as high mechanical properties and dimensional stability have been required for a base film of a photosensitive material as well as a thinner film has been required as the base film.

A biaxially oriented PET film has excellent transparency, mechanical properties and dimensional stability, and it has been used instead of a TAC film in the fields of a micro film calling for a thin film and a sensitive film for printing calling for a strict dimensional stability. In a PET film, however, because its water absorption property is poor, it cannot have a high curl-extinguishing property such as one of TAC film. Therefore, use of a PET film is restricted because the handling ability thereof after processing is not good, although it has excellent properties as mentioned above.

Some attempts giving a water absorption property to a PET film by improving a PET polymer have been proposed. For example, JP-A-HEI 1-244446 discloses a biaxially oriented film composed of a polymer which is prepared by copolymerizing PET with 5-sodium sulfoisophthalic acid and adipic acid. However, since the water absorption speed thereof is lower than that of a TAC film, a sufficient curl-extinguishing property cannot be obtained. U.S. Pat. Nos. 4,217,441 and 4,241,170 disclose biaxially oriented films wherein polyethylene glycol and 5-sodium sulfoisophthalic acid are copolymerized with PET. However, the object of these proposals is merely to give a permeability to water vapor to the films, and the films are not subjected to a photographic roll film. Therefore, although these films have some water absorption properties, the curl-extinguishing properties thereof are lower than that of a TAC film. Moreover, the transparencies of the films deteriorate by the aging properties, and the Young's moduluses thereof after water absorption greatly decrease.

SUMMARY OF THE INVENTION

An object of the present invention is to provide a polyester film which can have an excellent water absorption property such as that of a TAC film, ultimately an excellent curl-extinguishing property such as that of a TAC film, while keeping excellent transparency, mechanical properties and dimensional stability such as those of a PET film, and a photosensitive material using the polyester film.

To accomplish this object and other objects, a polyester film according to the present invention is herein provided. The polyester film comprises a polyester whose dicarboxylic acid copolymerized component contains an aromatic dicarboxylic acid having a metal sulfonate and/or a derivative thereof, and a polyetherdicarboxylic acid represented by chemical formula (a) and having a mean molecular weight in the range of 600 to 20000 and/or a derivative thereof. The chemical formula (a) is expressed as follows.

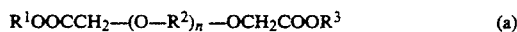

$$R^1OOCCH_2-(O-R^2)_n-OCH_2COOR^3 \quad (a)$$

Where, "$R^1$" and "$R^3$" are alkyl groups each having a carbon number of 1 to 8, "$R^2$" is alkylene group having a carbon number of 2 to 8 and "n" is a positive integer.

A photosensitive material according to the present invention is provided by using the above polyester film. Namely, the photosensitive material comprises a base layer formed from the above polyester film and at least one photosensitive layer provided on the base layer. The photosensitive layer may be formed by a known method using a known photosensitive emulsion or other materials.

In the polyester film according to the present invention, the polyester whose dicarboxylic acid copolymerized component contains the aromatic dicarboxylic acid having a metal sulfonate and/or a derivative thereof, and the polyetherdicarboxylic acid represented by chemical formula (a) and having a mean molecular weight in the range of 600 to 20000 and/or a derivative thereof has an excellent water absorption property. Therefore, the polyester film and the photosensitive material using the polyester film can have an excellent curl-extinguishing property, thereby preventing the various troubles in a roll type photosensitive film. At the same time, since the polyester film can keep excellent transparency, mechanical properties and dimensional stability such as those of a PET film, the use of the photosensitive material using the polyester film can be greatly developed for various uses.

DETAILED DESCRIPTION OF THE PREFERRED EMBODIMENTS OF THE INVENTION

Next, the present invention will be explained in more detail by embodiments and examples. However, the present invention is not restricted by the embodiments and examples.

The polyester film according to the present invention includes a copolymerized polyester whose copolymerized component comprises an aromatic dicarboxylic acid having a metal sulfonate and/or a derivative thereof. As the aromatic dicarboxylic acid having a metal sulfonate, 5-sodium sulfoisophthalic acid, 2-sodium sulfoterephthalic acid, 4-sodium sulfophthalic acid, 4-sodium sulfo-2,6-naphthalene dicarboxylic acid and compounds substituting other metals such as potassium or lithium, or ammonium salt or phosphonium salt for the sodium of these aromatic dicarboxylic acids can be used. The rate of copolymerization of the aromatic dicarboxylic acid having a metal sulfonate is preferably in the range of 2 to 20 wt % relative to the reaction product of polyester, more preferably in the range of 4 to 15 wt %, and the most preferably in the range of 5 to 12 wt %.

The copolymerized polyester according to the present invention further contains a polyetherdicarboxylic acid represented by the following chemical formula (a) and/or a derivative thereof from the viewpoint of giving transparency, dimensional stability and mechanical properties to the film.

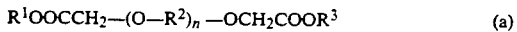

$$R^1OOCCH_2-(O-R^2)_n-OCH_2COOR^3 \quad (a)$$

Where, "$R^1$" and "$R^3$" are alkyl groups each having a carbon number of 1 to 8, "$R^2$" is alkylene group having a carbon number of 2 to 8 and "n" is a positive integer. The mean molecular weight of this polyetherdicarboxylic acid is in the range of 600 to 20000. The mean molecular weight is preferably in the range of 1000 to 15000, and more preferably in the range of 2000 to 10000. If the mean molecular weight is smaller than 600, the water absorption property is insufficient, and therefore, a sufficient curl-extinguishing property cannot be obtained. It is better that the chain of the polyether is long in order to obtain a good curl-extinguishing property such as one of a TAC film. However, if the mean molecular weight is greater than 20000, the transparency and rigidity of the film decrease, and this is not desirable. As the polyetherdicarboxylic acid, polyethyleneoxydicarboxylic acid and polytetramethyleneoxydicarboxylic acid are preferable. Particularly, polyethyleneoxydicarboxylic acid represented by the following chemical formula (b) is preferable from the viewpoint of the reaction ability of copolymerization of the polyester and the dimensional stability of the film.

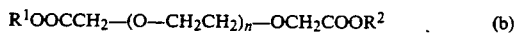

$$R^1OOCCH_2-(O-CH_2CH_2)_n-OCH_2COOR^2 \quad (b)$$

Where, "$R^1$" and "$R^2$" are "H" or alkyl groups each having a carbon number of 1 to 8 and "n" is a positive integer. The rate of copolymerization of the polyetherdicarboxylic acid is preferably in the range of 2 to 20 wt % relative to the reaction product of polyester, more preferably in the range of 4 to 15 wt %, and the most preferably in the range of 5 to 12 wt %.

The polyester film according to the present invention has a remarkable characteristic that the film has a high water absorption speed at about the same level as that of a TAC film. Namely, the rate of increase in weight of the polyester film determined after the polyester film is left in an atmosphere under the conditions of 25° C. and 55%RH for 48 hours, the moisture percentage of the film reaches an equilibrium condition, and thereafter the film is dipped in a distilled water having a temperature of 25° C., for 15 minutes, is preferably not less than 0.7%, and more preferably not less than 0.9%. Further, the rate of increase in weight of the polyester film determined after the polyester film is dipped in water for 30 minutes is preferably not less than 1.5%, and more preferably not less than 2.0%. In the polyester film according to the present invention, the film absorbs water in such a short period of time, and the curl of the film is therefore extinguished.

In the present invention, the polyester is a polyester whose main components are an aromatic dibasic acid and glycol. As the dibasic acid, terephthalic acid, isophthalic acid, phthalic acid, naphthalenedicarboxylic acid, diphenylsulfonedicarboxylic acid, diphenyletherdicarboxylic acid, diphenoxyethanedicarboxylic acid, cyclohexanedicarboxylic acid, diphenyldicarboxylic acid, diphenylthioetherdicarboxylic acid, diphenylketonedicarboxylic acid and phenylindandicarboxylic acid can be used. As the glycol, ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl)sulfone, diethylene glycol, neopentyl glycol, hydroquinone and cyclohexanediol can be used. Among the polyesters composed of these components, polyethylene terephthalate, polycyclohexanedimethylene terephthalate and polyethylene naphthalate are preferable from the viewpoint of obtaining good heat resistance, mechanical properties and dimensional stability.

The glass transition temperature of the polyester film according to the present invention is preferably not less than 50° C., and more preferably not less than 60° C. The glass transition temperature is determined by measuring the glass transition temperature of a film left in an atmosphere under the conditions of 25° C., and 50%RH by a differential scanning calorimeter. If the glass transition temperature is lower than 50° C., there is a fear that the film deforms, for example, in an atmosphere with a high temperature in summer. Although the heat resistance of the film increases as the glass transition temperature thereof elevates, the curl-extinguishing property of the film decreases as the glass transition temperature elevates. Therefore, it is necessary to lower the glass transition temperature of the film when the film absorbs water by increasing the water absorption property of the film. The glass transition temperature when a film absorbs water is determined by measuring the glass transition temperature of the film by a differential scanning calorimeter immediately after the film is dipped in a distilled water having a temperature of 38° C. for 30 minutes. This glass transition temperature when the film absorbs water is preferably not higher than 60° C., and more preferably not higher than 50° C.

In the present invention, a long-chain aliphatic dicarboxylic acid and/or a derivative thereof, an aliphatic polyester or a polyalkylene glycol may be copolymerized in order to provide a sufficient curl-extinguishing property to the polyester film. The long-chain aliphatic dicarboxylic acid means a dicarboxylic acid having an alkylene group with a carbon number of 8 to 60 such as sebacic acid, eicosanic acid, dodecanedicarboxylic acid and dimer acid, and the carbon number is preferably in the range of 10 to 50. As the aliphatic polyester, poly-a-caproractone, poly(methyl-ε-caproractone) and poly-β-propioractone can be used, and the mean molecular weight thereof is preferably in the range of about 800 to 40000, more preferably in the range of 2000 to 20000. As the polyalkylene glycol, polyethylene glycol, polypropylene glycol, polytetramethylene glycol and polyethylene glycol-polypropylene glycol copolymer can be used, and the mean molecular weight thereof is preferably in the range of about 600 to 20000. The rate of the copolymerization is in the range of 0 to 20 wt % relative to the reaction product of polyester, preferably in the range of 2 to 10 wt %, and more preferably in the range of 3 to 8 wt %. In particular, the long-chain aliphatic dicarboxylic acid or the aliphatic polyester is preferably copolymerized in order to increase the curl-extinguishing property and the tensile Young's modulus after water absorption of the film.

Alternatively, an esterified polymer made by modifying a polyolefine such as polyethylene, polypropylene or ethylene/propylene copolymer may be copolymerized as a long chain component in order to increase the curl-extinguishing property and the tensile Young's modulus after water absorption of the film. The mean molecular weight after modification is preferably in the range of 500 to 10000. The rate of the copolymerization is in the range of 0 to 20 wt % relative to the reaction product of polyester, preferably in the range of 0.5 to 5 wt %, and more preferably in the range of 1 to 3 wt %.

A rigid component is preferably copolymerized in order to increase the tensile Young's modulus after water absorption of the film. As such a rigid component, 4,4'-diphenyldicarboxylic acid, 2,6-naphthalenedicarboxylic acid, diphenylether-4,4'-dicarboxylic acid, diphenoxyethane-4,4'-dicarboxylic acid, diphenoxybutane-4,4'-dicarboxylic acid, diphenylethane-4,4'-dicarboxylic acid, 4,3'-diphenyldicarboxylic acid, diphenoxyethane-3,3'-dicarboxylic acid, diphenylethane-3,3'-dicarboxylic acid, naphthalene-1,6'-dicarboxylic acid, hydroquinone, 4,4'-dioxydiphenyl, 2,6-naphthalenediol, 4,4'-dioxydiphenylether, bis(4-oxyphenoxy)ethane, 3,3'-dioxydiphenyl, phenylhydroquinone, 4-hydroxybenzoic acid, 3-hydroxybenzoic acid, 6-hydroxy-2-naphthoic acid and 6-hydroxy-1-naphthoic acid can be used. A single or a plurality of these rigid components are copolymerized. The rate of the copolymerization is in the range of 0 to 40 wt % relative to the reaction product of polyester, preferably in the range of 5 to 30 wt %, and more preferably in the range of 10 to 20 wt %.

In the polyester film according to the present invention, a small amount of accelerator for water absorption such as a single terminal closed type polyether compound may be added to the film in order to increase the water absorption speed of the film, as long as the transparency or mechanical properties of the film is not damaged. The single terminal closed type polyether compound is represented by, for example, the following chemical formulas.

Where, "$R^4$" is an alkyl group having a carbon number of 1 to 5 and "n" is an integer in the range of 30 to 500. The preferable molecular weight is in the range of 600 to 20000. The addition amount of these accelerators for water absorption is preferably in the range of 0 to 15 wt % relative to the polyester component.

The polyester film according to the present invention may have a structure of a plurality of layers. When the layer of the polyester containing the aromatic dicarboxylic acid and the polyetherdicarboxylic acid is expressed as "A" layer and the layers other than "A" layer are expressed as "B" and "C" layer, the polyester film according to the present invention can have a lamination structure of a two layer structure of A/B, or a three layer structure such as A/B/A, B/A/B or B/A/C, or other or further multiple layer structure. Since the polyester of "A" layer is copolymerized, its crystallinity decreases as compared with a homopolyester, and therefore the mechanical properties, transparency and dimensional stability of the "A" layer tends to decrease. Accordingly, by laminating "A" layer which is a copolymerized PET layer with a PET layer or other homopolymer layers by co-extruding them, a polyester film having an excellent water absorption property such as one of a TAC film, ultimately an excellent curl-extinguishing property such as one of a TAC film can be obtained while high mechanical properties, transparency and dimensional stability such as those of an ordinary PET film can be maintained. Further, in a case where good slipping property, coloring property or antistatic property is given to the surface of the film, a necessary additive may be added only to the surface layer. Therefore, the transparency of the film as a whole can be maintained at a high level, and the cost of the film can be reduced.

Firstly, the lamination structure of A/B, B/A/B or B/A/C will be explained. Although a low grade polymer may be deposited in heat treatment for providing a subbing layer depending upon the condition of copolymerization ratio of "A" layer in the present invention, in such a case, the deposition of the low grade polymer can be suppressed by laminating "B" layer of a polyester different from the polyester of "A" layer on one surface or each surface of the "A" layer, thereby maintaining the transparency of the film. As the polyester of "B" layer, the aforementioned polyesters can be used. Particularly, polyethylene terephthalate, polycyclohexanedimethylene terephthalate and polyethylene naphthalate are preferable. The thickness of "B" layer is preferably in the range of 0.05 to 20μm, more preferably in the range of 0.5 to 10μm and further more preferably in the range of 1 to 5μm. When "B" layer is employed, it is desirable to form the "B" layer as thin as possible in the range capable of suppressing the deposition of the low grade polymer from "A" layer, because the polyester film according to the present invention is required for a high water absorption property as a whole. Alternatively, "B" layer itself may have a water absorption property. For example, a copolymerized polyester whose copolymerization component is an aromatic dicarboxylic acid having a metal sulfonate can be employed. As the aromatic dicarboxylic acid having a metal sulfonate, the aforementioned compounds can be used. The rate of the copolymerization is in the range of 1 to 20 wt % relative to the reaction product of polyester, preferably in the range of 3 to 12 wt %, and more preferably in the range of 4 to 10 wt %. Further, polyetherdicarboxylic acid, polyalkylene glycol or a long-chain aliphatic dicarboxylic acid may be copolymerized by a small amount within the range capable of preventing the mechanical properties and transparency of the film from decreasing. Furthermore, a polyester whose low grade polymer component is reduced by solid phase polymerization may be employed.

The lamination structure of A/B is effective to prevent a low grade polymer from being deposited from one surface of the film. Moreover, a curl of the film can be efficiently extinguished by utilizing the difference between the curl-extinguishing property of "A" layer and the curl-extinguishing property of "B" layer.

Next, the lamination structure of A/B/A will be explained. "A" layer may be laminated on each surface of "B" layer with a relatively large thickness. The "A" layers have a curl-extinguishing property and the "B" layer has high mechanical properties and dimensional stability. As the polyester of the "B" layer, the aforementioned polyesters can be employed. Since a low grade polymer may remain in the polyester of the "A" layer, a "C" layer may be further provided on the outside of the "A" layer to prevent the low grade polymer from being deposited from the "A" layer. For example, a five layer structure of C/A/B/A/C can be formed. As the polyester of the "C" layer, the same polyesters as those for "B" layer can be used. The low grade polymer in the polyester of the "C" layer is desired to be as little as possible. The thickness of the "C" layer is desired to be as small as possible in the range capable of suppressing the deposition of the low grade polymer from the "A" layer.

The glass transition temperature of the polyester of "B" layer is preferably not less than 60° C., more preferably not less than 65° C., and further more preferably not less than 70° C. In the present invention, since the strength of "A" layer is slightly low, the strength of the film as a whole can be maintained by laminating "B" layer whose glass transition temperature is high.

In the present invention, the thickness of "A" layer is not particularly restricted. The ratio of the thickness of "A" layer to the total thickness of the entire film may be in the range of 1 to 99%. As a concrete means for lamination of a plurality of layers, co-extrusion using a plurality of extruders and a feed block or a multimanifold die can be employed.

The haze of the polyester film according to the present invention is preferably not greater than 5%, and more preferably not greater than 2%. If the haze of the film exceeds 5%, an image is bloomed in a photosensitive material using the film.

One of the problems caused when a polyester film is used for the base film of a photosensitive material is light piping caused by the high refractive index of the base film. Although the refractive index of a TAC film is low (about 1.5), the refractive index of a polyester film is high (about 1.6). The refractive index of gelatine which is used for a subbing layer and a photosensitizing emulsion layer is in the range of 1.50 to 1.55. In the case of a TAC film, the ratio of refractive index relative to gelatine is 1.50-1.55/1.5, and there is no problem because the ratio is greater than 1. In the case of a polyester film, however, the ratio is 1.50-1.55/1.6, and the ratio is smaller than 1. When a light enters into the film from the film edge, the light tends to reflect at a boundary between the base film and the emulsion layer. Therefore, light piping is liable to occur in a photosensitive material using a polyester film.

To prevent such a light piping, a method wherein inert inorganic particles are contained in the film and a method wherein a dye is added to the film are known. In the present invention, the latter method is preferable for preventing light piping because the method does not increase the haze of the film so much.

The dye for coloring the film is not particularly restricted. However, the tone is preferably gray from the viewpoint of general requirements for a photosensitive material. The dye is preferably one having an excellent heat resistance at a temperature within the range for film formation, and an excellent heat compatibility with a polyester. Such a dye can be prepared by blending a plurality of known dyes in commerce, for example, "Diaresin" produced by Mitsubishi Kasei Corporation and "Kayaset" produced by Nihon Kayaku Corporation. The density of the coloring due to the dye can be determined by a densitometer, for example, produced by Macbeth Corporation, and the determined color density in visible region is preferably not less than 0.01, more preferably not less than 0.03.

The polyester film according to the present invention can be provided with a good slipping property in accordance with uses. Although the method for providing a good slipping property is not particularly restricted, a method for blending inert inorganic particles or a method for coating a surface active agent are generally employed. As the inert inorganic particles, for example, particles of $SiO_2$, $TiO_2$, $BaSO_4$, $CaCO_2$, talc or kaolin can be used. Alternatively, a method wherein a good slipping property is given by non-incorporated particles formed by, for example, a catalyst added in copolymerization of polyester can be employed instead of the above method for adding inert inorganic particles from outside of polyester. Any method among these methods can be employed. However, since transparency is important for a base film of a photosensitive material, a method wherein inert inorganic particles of $SiO_2$ having a refractive index relatively similar to that of a polyester film are added, and a method wherein non-incorporated particles capable of making their particle diameter relatively small are formed, are preferably selected. In a case where a good slipping property is given by a method for blending inert inorganic particles, a method, wherein the layer with the blended particles is laminated on a polyester film by co-extrusion, is also preferable in order to further increase the transparency of the film.

The heat shrinkage after 30 minutes, at 150° C, of the polyester film according to the present invention is preferably not greater than 2%, and more preferably not greater than 1.5%. Although the heat shrinkage of a TAC film or a PET film is not greater than 2%, the heat shrinkage of a copolymerized polyester film generally tends to be large. In the present invention, however, the heat shrinkage of the copolymerized polyester film can be suppressed to be lower than that of a PET film, and this is one of remarkable characteristics according to the present invention. In a case where a film is used as a base film of a photosensitive material, a necessary adhesive force cannot be obtained by coating a hydrophilic emulsion (gelatin binder) directly onto a hydrophobic polyester film or a TAC film. Therefore, a subbing layer is usually provided. In this process, a temperature of about 150° C. is applied to the film. Further, the emulsion coated is dried at a temperature of 100° to 150° C. It is desired that the film does not deform in these processes, namely, a good dimensional stability is required to the film. The small heat shrinkage of the copolymerized polyester film according to the present invention is advantageous for such processes.

The tear resistance of the polyester film according to the present invention is preferably not less than 500 g/mm, and more preferably not less than 800 g/mm. The tear resistance of a TAC film is generally from 200 g/mm to 400 g/mm. Although the low tear resistance of a TAC film has been necessary for editing operation, it has caused a tear of the film in perforation punching. Therefore, a high tear resistance is required for an ordinary photographic film.

The strength at break of the polyester film according to the present invention is preferably not less than 8 kg/mm$^2$, and more preferably not less than 13 kg/mm$^2$. Young's modulus of the film is preferably not less than 300 kg/mm$^2$, and more preferably not less than 350 kg/mm$^2$. The Young's modulus of the film determined immediately after the film is dipped in a distilled water having a temperature of 38° C. for 30 minutes is preferably not less than 280 kg/mm$^2$, and more preferably not less than 300 kg/mm$^2$. If these mechanical properties decrease, there is a fear that the film is deformed or broken by an external force when the film is wound in a camera or in automatic processing and printing by a processing and printing machine.

The raw polymer of the polyester film according to the present invention can be produced by a known synthesis process. For example, a copolymerized polyester can be obtained by a method for esterifying an acid component directly with a glycol component, or, in a case where dialkylester is used as an acid component, a method for transesterifying dialkylester with a glycol component and removing surplus glycol component by heating the reaction product under a reducing pressure. In these processes, a catalyst for transesterification or a catalyst for copolymerization may be used, or a thermostabilizer may be added as needed. Of course, in practice, anti-coloring agent, anti-oxydant, crystal nuclei forming agent, lubricant, anti-blocking agent, viscosity control agent, antifoaming agent, transparency accelerating agent or antistatic agent may be added.

The polyester obtained is generally formed as pellets, molten after drying, and extruded from a T-die in a form of a non-oriented sheet. Although the drying time may be relatively long because the polyester according to the present invention has a water absorption property, the polyester can be melt-extruded, even if the polyester is insufficiently dried, by using a vent type twin-screw extruder.

When the molten polyester sheet is cast on a cooling roll, electrostatic casting is preferably employed. Further, a thin water layer is preferably interposed between the cooling roll and the molten polyester sheet to improve the flatness of the sheet and to easily take off the sheet, which has a high affinity with a metal because of copolymerization, from the cooling roll to prevent surface scratches. Although this process for interposing a water layer between the cooling roll and the molten polyester sheet is not particularly restricted, for example, a method wherein water is applied by using a sponge roll or a porous roll, a method wherein saturated water vapor is blown onto the surface of the cooling roll and the water vapor is bedewed on the surface, or a method wherein water is sprayed by utilizing an ultrasonic wave, can be employed. In the present invention, the bedewing method is preferable from the viewpoint of uniformity of the formed water layer. The thickness of the water layer is preferably in the range of 0.05 to 2 μm, and more preferably in the range of 0.1 to 0.8 μm from the viewpoint of adhesive property and take-off property in casting.

Although the non-oriented sheet obtained can be used as it is, because die lines are generated on the surfaces of the sheet when the sheet is delivered out from the T-die, an image is distorted by the lines when the sheet is used as a photographic film. Accordingly, the surface of the sheet is preferably flattened. For example, the delivered molten sheet is pressed and cooled between a casting drum and a cooling roll attached thereto, or between a casting drum and an endless metal belt. In such a process, not only the surface of the casting drum but also the surface of the attached cooling roll or endless metal belt are required to be flat, namely, the surface roughness thereof is required to be not greater than 0.2S. By such a process, the film can be sufficiently cooled, and the crystallization of the surfaces of the film is appropriately prevented by rapidly cooling the surfaces. Alternatively, a method, wherein the anti-drum side of the film cast on a drum having a surface roughness of not greater than 0.2S is pressed by an attached roll heated at a temperature higher than the glass transition temperature and thereafter the film is rapidly cooled by a cooling roll, may be employed. Further, a method, wherein the delivered molten polymer is temporarily stored between two rolls each having a surface roughness of not greater than 0.2S and the polymer is calendered and delivered out from a position between the rolls, may be employed. Furthermore, a method, wherein the delivered molten polymer is cast onto an endless metal belt having a surface roughness of not greater than 0.2S, the polymer is heated and pressed by another endless metal belt having a good surface roughness and the heated and pressed polymer is rapidly cooled, may be employed.

The non-oriented sheet obtained is preferably biaxially stretched to provide mechanical properties to the film. Although sequential biaxial stretching and simultaneous biaxial stretching can be both used as the biaxial stretching process, the sequential biaxial stretching for firstly stretching the film longitudinally and thereafter stretching the film transversely is more preferable. The temperature for stretching is preferably in the range of from the glass transition temperature to the cold crystallization temperature. In the present invention, the temperature for longitudinal stretching is preferably in the range of 60° to 120° C. and the temperature for transverse stretching is preferably in the range of 70° to 150° C. The draw ratio is usually in the range of 2.0 to 5.0 times. It is better to increase the draw ratio as high as possible within the range in which the film formation ability does not decrease in order to increase the strength of the film. Namely, the draw ratio is preferably not less than 3.5 times, more preferably not less than 4.0 times. The film may be re-stretched in the longitudinal or transverse direction after the above longitudinal and transverse stretching.

In the longitudinal stretching, a multi-stage stretching can be employed. When a polyester film is stretched in the transverse direction after stretched in the longitudinal direction by a single stage stretching, it is difficult to obtain a film having a uniform thickness. Even if a film having a uniform thickness can be obtained, the flatness and uniformity in thickness deteriorate by aging after film formation. Accordingly, for example, after the film is stretched at a temperature higher than 100° C., the film is preferably further stretched at a temperature lower than that temperature. It is difficult to improve the uniformity in thickness of a film having a water absorption property merely by dividing the stretching zone into multi-stage stretching zones. Namely, it is better to firstly pre-stretch the film at a temperature higher than 100° C. and thereafter stretch the film in multi-stage at a temperature lower than that temperature so as to orient the film at a high level. In a case where the multi-stage stretching is carried out under a condition of a draw ratio lower than a yield point, the number of stages of the multi-stage stretching increases to, for example, 5 to 10 stages, but usually the multi-stage stretching with 2 to 4 stages is employed. Although the draw ratios in the multi-stage stretching are not particularly restricted, preferably the draw ratio of the first stage is in the range of 1.0 to 1.8 times, the draw ratio of the second stage and third stage is in the range of 1.05 to 2.5 times and the draw ratio of the fourth stage is in the range of 1.3 to 3 times, and the total draw ratio is preferably in the range of 4 to 10 times, and more preferably in the range of 5 to 8 times from the viewpoint of improvement of the uniformity in thickness and quality of the film. In this case, the temperature of the first stage is preferably higher than 100° C., and as the case may be, the temperature of the second and third stages is also preferably higher than 100° C. Although the multi-stage stretching process is not particularly restricted, the processes disclosed in JP-B-SHO 52-33666 and JP-B-SHO 57-48377 can be used.

To increase the tear resistance of the film, preferably the draw ratio is set to be high as well as the draw ratio of the longitudinal stretching and the draw ratio of the transverse stretching are balanced as close as possible. Each draw ratio is preferably higher than 3.4 times, more preferably higher than 3.8 times, and the difference between the draw ratio of the longitudinal stretching and the draw ratio of the transverse stretching is preferably lower than 0.7 times, more preferably lower than 0.5 times.

The stretched film may be heat treated. The heat treatment may be under any condition of constant length, releasing condition or fine stretching condition. The temperature for the heat treatment is preferably in the range of 150° to 230° C., and more preferably in the range of 170° to 220° C. The time for the heat treatment is preferably in the range of 0.5 to 60 seconds. A intermediate cooling process at a temperature in the range of 100° to 180° C. may be employed after the heat treatment at a temperature higher than 200° C. In particular, since a high temperature is desirable for the heat treatment of the film in the present invention within the range in which the film formation ability does not decrease, the heat shrinkage at 150° C. of the film can be reduced and further the curl-extinguishing property of the film can be improved by the above high-temperature heat treatment successively accompanying with the intermediate cooling process. Furthermore, the film according to the present invention can be improved in strength at break and tear resistance with a good balance and a low heat shrinkage and a good curl-extinguishing property can be also obtained, by stretching the film at a high draw ratio and thereafter heat treating at a high temperature.

Although the thickness of the copolymerized polyester film according to the present invention is not particularly restricted, in the case of a stretched film the thickness is preferably in the range of 3 to 360 μm, and in the case of a non-stretched film the thickness is preferably in the range of 50 to 2000 μm. In the field of photographic films, the thickness of the polyester film is preferably in the range of 25 to 250 μm, and more preferably in the range of 40 to 150μm.

A specified compound may be laminated on the surface of the film by coating at an appropriate process in the film formation process. For example, a polymer including sulfonate or a polymer composed of acrylic copolymer in a state of aqueous solution or dispersion is applied onto the film, the film is sufficiently dewatered in a preheating zone of the transverse stretching process, and thereafter the film is stretched in the transverse direction and heat treated. A coating layer with a thickness in the range of 0.001 to 1 μm, preferably in the range of 0.01 to 0.4 μm can be formed by such a process. An adhesive property or an antistatic property can be provided to the film by the application.

In the polyester film according to the present invention, various surface treatment such as corona treatment, chemical treatment or flame treatment can be applied to the film as needed, in order to improve the adhesive property of the film or the wetting property for coating. In the present invention, corona treatment is desirable.

Further, in the polyester film according to the present invention, when the film is used for a photosensitive material, a necessary subbing layer may be provided in order to increase the adhesive property between the polyester film and a photosensitive layer applied thereon. Furthermore, a backing layer for providing antistatic property, anti-halation property, curl balancing property, slipping property or scratch resistance may be applied in a known manner. The emulsion layer or other coating layers are applied also in a known manner.

The polyester film according to the present invention has excellent transparency, thermostability and mechanical properties as well as an excellent water absorption. Therefore, the film can be also utilized for various uses other than a base layer or a cover layer of a photosensitive material. For example, the film can be used for a film for an overhead projector, various optical films, and wrapping films for, for example, fresh provision.

Next, methods for determining and estimating the characteristics in the present invention will be explained.

(1) Glass transition temperature, Cold crystallization temperature

A differential scanning calorimeter (DSC-2 type; produced by Perkin Elmer corporation) is used for determination. A sample of 10 mg is placed at a melting state for five minutes in a atmosphere of nitrogen at a temperature of 280° C., and thereafter the sample is rapidly cooled in liquefied nitrogen. The sample obtained is heated at a speed of 10° C./min., the change of specific heat due to the transition to a glass state or a rubber state caused during the elevation of the temperature is determined, and the temperature causing this change is determined as the glass transition temperature. Further, the exothermic peak temperature accompanied with crystallization is determined as the cold crystallization temperature.

(2) Haze

The haze of a film is determined based on ASTM-D1003-52.

The haze after aging is determined after aging a film in an atmosphere at a temperature of 40° C. and a humidity of 90%RH for two weeks.

(3) Rate of increase in weight

The rate of increase in weight is determined as a difference between the weight of a sample film determined after aged in an atmosphere at a temperature of 25° C. and a humidity of 55%RH for 48 hours and the weight of the sample film determined after dipped in a distilled water having a temperature of 25° C. for 30 minutes.

(4) Heat shrinkage

A sample film with a width of 10 mm and a length of 250 to 300 mm is marked at an interval of 200 mm. The sample is fixed to a sample support plate at a constant tension, and the original length between the marks is determined by a universal projector (type: V16A, produced by Nihon Kogaku Corporation). A load of 3 g is applied to the sample by using a crip, and the sample is heat treated in an oven heated at 150° C. while the sample is being rotated. The treated sample is left in the same atmosphere as that used in the determination of the original length for two hours, thereafter the distance between the marks is measured in the same manner as in the determination of the original length, and the heat shrinkage is calculated from the difference between the original length and the length after heat treatment.

(5) Tear resistance

The tear resistance is determined based on ASTM-D-1922 by using a light load type tear tester (produced by Toyo Seiki Corporation). The size of a sample is 51×64 mm. A notch is provided at a position of 13 mm from the edge, and the tear resistance is determined as a value indicated when the remaining portion with the remaining length of 51 mm is torn.

(6) Curl-extinguishing property

A polyester film is sampled at a width of 35 mm in the transverse direction of the film and a length of 135 mm in the longitudinal direction of the film. The sample obtained is wound on a core having a diameter of 10 mm, and heat treated in an atmosphere at a temperature of 70° C., and a humidity of 30%RH for 72 hours. Thereafter, the sample is removed from the core, and after the sample is dipped in a distilled water having a temperature of 38° C. for 30 minutes, the sample is dried in an oven at a temperature of 50° C. for 5 minutes in a state loaded with a tension of 30 g. The diameter of a cylindrical shape formed when the treated sample is placed on a flat surface is determined. The curl-extinguishing property is estimated by the following five ranks.

Rank 5: The film does not curl and the film becomes in a form of a plane.
Rank 4: The diameter of the formed cylinder is not less than 60 mm.
Rank 3: The diameter of the formed cylinder is in the range of not less than 40 mm to less than 60 mm.
Rank 2: The diameter of the formed cylinder is in the range of not less than 20 mm to less than 40 mm.
Rank 1: The diameter of the formed cylinder is less than 20 mm.

Strength at break, Young's modulus

The strength at break and the Young's modulus are determined based on JIS-Z1702-1976 by using a sample of a strip piece with a width of 10 mm and a length of 100 mm. The tensile speed is 300 mm/min. for the determination of the strength at break and 20 mm/min. for the determination of the initial elastic modulus. The tensile Young's modulus after water absorption is determined immediately after the strip piece sample is dipped in water having a temperature of 25° C. for 30 minutes.

(8) Inherent viscosity

The inherent viscosity is determined at a temperature of 25° C. using o-chlorophenol as a solvent.

(9) Uniformity in thickness

A film is sampled in the longitudinal direction by 10 m (or in the transverse direction by the entire width of the film). The thickness of the sample obtained is determined by a electronic continuous type thickness gauge, and the uniformity in thickness is defined as a value expressed by percentage which is calculated by dividing the difference between the maximum thickness Tmax and the minimum thickness Tmin by the mean thickness Tav.

(10) Flatness

A sample is stretched on a formal pingpong table at a state loaded by a tension of 100 g/m. A piano wire is stretched on the sample, and the flatness is determined by measuring the linearity and distortion of a projected line of the wire on the sample. If the sample has a good flatness, the wire is observed as a complete linear line. If the flatness is poor, the wire is observed as a distorted line. The degree of the flatness can be further classified by the degree of the linearity of the observed line.

EXAMPLES

Some preferred examples will be hereinafter explained together with some comparative examples. The resulted data of determination and estimation are shown in Tables 1 to 4.

Example 1

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight and polyethyleneoxydicarboxylic acid having a mean molecular weight of 4000 of 10 parts by weight, and esterification was carried out by a regular method. Trimethylester phosphate of 0.05 part by weight was added to the obtained product, the product was gradually heated and reduced in pressure, and a copolymerized polyester having an inherent viscosity "IV" of 0.9 was obtained by finally copolymerizing under a condition of a temperature of 280° C. and a pressure of not greater than 1 mmHg.

After the copolymerized polyester was dried by a regular method, the polyester was melt-extruded at a temperature of 280° C. and a non-stretched sheet was made by using electrostatic casting. Thereafter, the sheet was stretched in the longitudinal direction at a draw ratio of 3.8 times at a temperature of 80° C., and sequentially in the transverse direction at a draw ratio of 4.0 times at a temperature of 85° C., and thereafter, the stretched film was heat set at a temperature of 210° C. for five seconds. As a result, a biaxially oriented polyester film having a thickness of 100 μm was obtained.

Example 2

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight, polytetramethyleneoxydicarboxylic acid having a mean molecular weight of 4000 of 5 parts by weight and adipic acid dimethyl of 5 parts by weight, and a copolymerized polyester was made and a polyester sheet was formed in the same manner as in Example 1. The sheet was stretched in the longitudinal direction at a draw ratio of 3.6 times at a temperature of 85° C., and sequentially in the transverse direction at a draw ratio of 4.0 times at a temperature of 90° C., and thereafter, the stretched film was heat set at a temperature of 200° C. for five seconds. As a result, a biaxially oriented polyester film having a thickness of 100 μm was obtained.

Example 3

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight, polyethyleneoxydicarboxylic acid having a mean molecular weight of 6000 of 5 parts by weight and polyethylene glycol having a mean molecular weight of 1000 of 5 parts by weight, and a copolymerized polyester was made and a polyester sheet was formed in the same manner as in Example 1. The sheet was stretched in the longitudinal direction at a draw ratio of 3.6 times at a temperature of 85° C., and sequentially in the transverse direction at a draw ratio of 4.0 times at a temperature of 90° C., and thereafter, the stretched film was heat set at a temperature of 200° C. for five seconds. As a result, a biaxially oriented polyester film having a thickness of 100 μm was obtained.

Example 4

Calcium acetate of 0.1 part by weight and antimony trioxide of 0.03 part by weight were added to naphthalene-2,6-dicarboxylic acid dimethyl of 100 parts by weight, ethylene glycol of 60 parts by weight, 5-sodiumsulfoisophthalic acid dimethyl of 10 parts by weight and polyethyleneoxydicarboxylic acid having a mean molecular weight of 4000 of 10 parts by weight, and a copolymerized polyester was made in the same manner as in Example 1.

After the copolymerized polyester was dried by a regular method, the polyester was melt-extruded at a temperature of 285° C. to make a non-stretched sheet. The sheet obtained was stretched in the longitudinal direction at a draw ratio of 3.5 times at a temperature of 110° C., and sequentially in the transverse direction at a draw ratio of 3.5 times at a temperature of 120° C., and thereafter, the stretched film was heat set at a temperature of 220° C. for five seconds. As a result, a biaxially oriented polyester film having a thickness of 100 μm was obtained.

Example 5

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight and polyethyleneoxydicarboxylic acid having a mean molecular weight of 4000 of 10 parts by weight, and a copolymerized polyester "A" having an inherent viscosity "IV" of 0.9 was made in the same manner as in Example 1.

Polyethylene terephthalate having an inherent viscosity "IV" of 0.7 was used as polyester "B", and $SiO_2$ particles having a mean particle diameter of 0.1 μm were added to the polyester "B" by 0.2 wt % as inert particles.

After the copolymerized polyesters were dried by a regular method, using two extruders and a die capable of co-extruding three layers, the polyester "A" was supplied to one of the extruders and the polyester "B" was supplied to the other extruder. The polyesters were melt-extruded at a temperature of 280° C., and non-stretched sheet having a lamination structure of B/A/B was formed. Thereafter, the sheet obtained was stretched in the longitudinal direction at a draw ratio of 3.8 times at a temperature of 80° C., and sequentially in the transverse direction at a draw ratio of 4.0 times at a temperature of 85° C., and thereafter, the stretched film was heat set at a temperature of 210° C. for five seconds. As a result, a biaxially oriented polyester film having a thickness of 100 μm was obtained. The respective thicknesses of B/A/B were 5 μm/90 μm/5 μm.

Example 6

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight, polytetramethyleneoxydicarboxylic acid having a mean molecular weight of 4000 of 5 parts by weight and adipic acid dimethyl of 5 parts by weight, and a copolymerized polyester "A" having an inherent viscosity "IV" of 0.9 was made in the same manner as in Example 1.

A polyester "B" having an inherent viscosity "IV" of 0.75 was made by adding calcium acetate of 0.1 part by weight and antimony trioxide of 0.03 part by weight to terephthalic acid dimethyl of 100 parts by weight, ethylene glycol of 70 parts by weight and 5-sodiumsulfoisophthalic acid dimethyl of 10 parts by weight.

The polyesters were co-extruded to make a sheet having a lamination structure of B/A/B in the same manner as in Example 5. The sheet obtained was stretched in the longitudinal direction at a draw ratio of 3.6 times at a temperature of 85° C., and sequentially in the transverse direction at a draw ratio of 4.0 times at a temperature of 90° C., and thereafter, the stretched film was heat set at a temperature of 200° C. for five seconds. As a result, a biaxially oriented polyester film having a thickness of 100 μm was obtained. The respective thicknesses of B/A/B were 5 μm/90 μm/5 μm.

Example 7

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight, polyε-caprolactone having a mean molecular weight of 6000 of 5 parts by weight and polyethyleneoxydicarboxylic acid having a mean molecular weight of 4000 of 5 parts by weight, and a copolymerized polyester "A" having an inherent viscosity "IV" of 0.9 was made in the same manner as in Example 1.

A polyester "B" having an inherent viscosity "IV" of 0.75 was made by adding calcium acetate of 0.1 part by weight and antimony trioxide of 0.03 part by weight to terephthalic acid dimethyl of 100 parts by weight, ethylene glycol of 70 parts by weight, 5-sodiumsulfoisophthalic acid dimethyl of 10 parts by weight and adipic acid dimethyl of 10 parts by weight.

The polyesters were co-extruded to make a sheet having a lamination structure of B/A/B in the same manner as in Example 5. The sheet obtained was stretched in the longitudinal direction at two stage of a draw ratio of 1.8 times at a temperature of 100° C.) and further a draw ratio of 3 times at a temperature of 80° C., and sequentially in the transverse direction at a draw ratio of 3.8 times at a temperature of 90° C., and thereafter, the stretched film was heat set at a temperature of 200° C. for five seconds. As a result, a biaxially oriented polyester film having a thickness of 100 μm was obtained. The respective thicknesses of B/A/B were 5 μm/90 μm/5 μm. A corona treatment was conducted on the surface of the film obtained.

Example 8

Calcium acetate of 0.1 part by weight, antimony trioxide of 0.03 part by weight and SiO₂ particles having a mean particle diameter of 0.1 μm by 0.1 wt % as inert particles were added to terephthalic acid dimethyl of 100 parts by weight, ethylene glycol of 70 parts by weight, 5-sodiumsulfoisophthalic acid dimethyl of 10 parts by weight, polyethyleneoxydicarboxylic acid having a mean molecular weight of 6000 of 5 parts by weight and polyethylene glycol having a mean molecular weight of 1000 of 5 parts by weight, and a copolymerized polyester "A" was made in the same manner as in Example 1.

Polyethylene terephthalate having an inherent viscosity "IV" of 0.7 was used as polyester "B", and the polyesters were co-extruded to make a sheet having a lamination structure of A/B/A in the same manner as in Example 5. The sheet obtained was stretched in the longitudinal direction at a draw ratio of 3.6 times at a temperature of 85° C., and sequentially in the transverse direction at a draw ratio of 4.0 times at a temperature of 90° C., and thereafter, the stretched film was heat set at a temperature of 200° C. for five seconds. As a result, a biaxially oriented polyester film having a thickness of 100 μm was obtained. The respective thicknesses of A/B/A were 30 μm/40 μm/30 μm.

Example 9

SiO₂ particles having a mean particle diameter of 0.1 μm by 0.2 wt % as inert particles were added to terephthalic acid dimethyl of 100 parts by weight, ethylene glycol of 70 parts by weight, 5-sodiumsulfoisophthalic acid dimethyl of 10 parts by weight and polyethyleneoxydicarboxylic acid having a mean molecular weight of 4000 of 10 parts by weight, and a copolymerized polyester "A" having an inherent viscosity "IV" of 0.85 was made in the same manner as in Example 1.

A polymer having an inherent viscosity "IV" of 0.70 which was made by copolymerizing 5-sodiumsulfoisophthalic acid by 15 mol % with polyethylene-2,6-naphthalate was used as polyester "B".

A polyester "C" having an inherent viscosity "IV" of 0.75 was made by adding calcium acetate of 0.1 part by weight and antimony trioxide of 0.03 part by weight to terephthalic acid dimethyl of 100 parts by weight, ethylene glycol of 70 parts by weight and 5-sodiumsulfoisophthalic acid dimethyl of 10 parts by weight.

After the copolymerized polyesters were dried by a regular method, using three extruders and a die capable of co-extruding five layers, the polyesters "A", "B" and "C" were supplied to the respective extruders. The polyesters were melt-extruded at a temperature of 280° C., and non-stretched sheet having a lamination structure of C/A/B/A/C was formed by co-extrusion. Thereafter, the sheet obtained was stretched in the longitudinal direction at a draw ratio of 3.5 times at a temperature of 95° C., and sequentially in the transverse direction at a draw ratio of 3.8 times at a temperature of 100 ° C., and thereafter, the stretched film was heat set at a temperature of 215° C. for five seconds. As a result, a biaxially oriented polyester film having a thickness of 100 μm was obtained. The respective thicknesses of C/A/B/A/C were 2 μm/30 μm/36 μm/30 μm/2 μm. A corona treatment was conducted on the surface of the film obtained.

Example 10

The same polymer as in Example 1 was used, the polymer which was not dried was supplied to a twin-screw vent type extruder. After the polymer was molten at a temperature of 280° C., the molten polymer was introduced into a T-die, and the molten polymer was delivered out from the die in the form of a sheet. A casting drum having a diameter of 2 m was used as a mobile cooling medium for cooling the polymer, the temperature of the surface of the drum was controlled at 20° C., saturated water vapor having a temperature of 85° C. was blown onto the drum surface, the blown water vapor was bedewed on the drum surface, and the mean thickness of the formed water layer which was determined by a infrared moisture meter was controlled to 0.3 μm. The molten polyester was cast onto the drum having the water layer, and cooled and solidified thereon while an electrostatic was applied. The non-stretched sheet thus obtained was stretched in the longitudinal direction at a draw ratio of 3.8 times at a temperature of 80° C. to make a uniaxially oriented film. A corona treatment was conducted on the surface of the film obtained, and the following a water soluble solution was coated on the film.

Acrylic copolymer (A)

Carboxyl group and methylol group were introduced as functional groups by each content of 2.5wt % into methylmethacrylate/ethylacrylate (50/50)mol % to make an acrylic copolymer (mean molecular weight: 500,000).

Sulfonated polystyrene and/or salt thereof (B)

A sulfonated polystyrene having a mean molecular weight of about 10000 and having $NH_4^+$ as $X^+$ ion of $SO_2O^-X^+$ group was used.

The weight ratio of (A)/(B) was controlled to 80/20, the controlled solution was diluted with water to 6wt %, and colloidal silica having a mean particle diameter of 0.12 μm was added as inorganic particles by 0.3 part by weight relative to the solid component of the solution. The solution thus obtained was used as the coating material.

After the coating material was applied onto the uniaxially oriented film so that the coating thickness after biaxially stretching was 0.07 μm, the film was sufficiently dried in a preheating process, the dried film was stretched in a tenter in the transverse direction at a draw ratio of 4.0 times at a temperature of 85° C., and thereafter, the stretched film was heat set at a temperature of 210° C. for five seconds. As a result, a biaxially oriented polyester film having a thickness of 100 μm and a coating thickness of 0.07 μm was obtained. A film having an excellent transparency which does not change after aging and an excellent adhesive property to a photosensitive layer could be obtained by such a coating.

Example 11

The same polymer as in Example 1 was used, the polymer which was not dried was supplied to a twin-screw vent type extruder. After the polymer was molten at a temperature of 280° C., the molten polymer was introduced into a T-die, and the molten polymer was delivered out from the die in the form of a sheet. A casting drum having a diameter of 2m was used as a mobile cooling medium for cooling the polymer, the temperature of the surface of the drum was controlled at 20° C., saturated water vapor having a temperature of 85° C. was blown onto the drum surface, the blown water vapor was bedewed on the drum surface, and the mean thickness of the formed water layer which was determined by a infrared moisture meter was controlled to 0.3 μm. The molten polyester was cast onto the drum having the water layer, and cooled and solidified thereon while an electrostatic was applied. The non-stretched sheet thus obtained was stretched in the longitudinal direction by a roll type stretching apparatus having three stage stretching zones. The sheet was stretched at the first stage at a draw ratio of 1.6 times at a temperature of 120° C., at the second stage at a draw ratio of 1.5 times at a temperature of 95° C., and at the third stage at a draw ratio of 2.5 times at a temperature of 87° C., by multi-stage stretching at a total draw ratio of 6.0 times. Thereafter, the film was stretched in a tenter in the transverse direction at a draw ratio of 3.5 times at a temperature of 90° C., and thereafter, the stretched film was heat treated (relax ratio in the transverse direction: 5%) at a temperature of 210° C. for five seconds. Immediately after the heat treatment, the film was intermediately heat treated at a temperature of 130° C., for three seconds, and thereafter the film was cooled to a room temperature. As a result, a biaxially oriented polyester film having a thickness of 100 μm. The film obtained had a good uniformity in thickness (both irregularities in thickness in the longitudinal direction and the transverse direction were 1%) in comparison with 3 to 5% in Example 1. Further, the flatness of the film was also good, and no sag was observed.

Comparative Example 1

Polyethylene terephthalate having an inherent viscosity "IV" of 0.65 and added with $SiO_2$ particles having a mean particle diameter of 0.1 μm by 0.1 wt % was prepared by a regular method. The polymer was formed as a sheet, the sheet was stretched in the longitudinal direction at a draw ratio of 3.5 times at a temperature of 90° C., and sequentially in the transverse direction at a draw ratio of 3.8 times at a temperature of 95° C., and thereafter, the stretched film was heat set at a temperature of 220° C., for five seconds. As a result, a biaxially oriented polyester film having a thickness of 100 μm was obtained.

Comparative Example 2

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight and polyethylene glycol having a mean molecular weight of 4000 of 10 parts by weight, and a copolymerized polyester was made in the same manner as in Example 1. The polymer was formed as a sheet, the sheet was stretched in the longitudinal direction at a draw ratio of 3.6 times at a temperature of 85° C., and sequentially in the transverse direction at a draw ratio of 4.0 times at a temperature of 90° C., and thereafter, the stretched film was heat set at a temperature of 200° C., for five seconds. As a result, a biaxially oriented polyester film having a thickness of 100 μm was obtained.

Comparative Example 3

Calcium acetate of 0.1 part by weight and antimony trioxide of 0.03 part by weight were added to terephthalic acid dimethyl of 100 parts by weight, ethylene glycol of 70 parts by weight, 5-sodiumsulfoisophthalic acid dimethyl of 10 parts by weight and adipic acid dimethyl of 10 parts by weight, and a copolymerized polyester was made in the same manner as in Example 1. The polymer was formed as a sheet, the sheet was stretched in the longitudinal direction at a draw ratio of 3.6 times at a temperature of 85° C., and sequentially in the transverse direction at a draw ratio of 3.8 times at a temperature of 90° C., and thereafter, the stretched film was heat set at a temperature of 200° C. for five seconds. As a result, a biaxially oriented polyester film having a thickness of 100 μm was obtained.

The resulted data of Examples 1 to 4 are shown in Table 1, the resulted data of Examples 5 to 9 are shown in Table 2, the resulted data of Examples 10 and 11 are shown in Table 3, and the resulted data of Comparative Examples 1 to 3 and the data of a TAC film are shown in Table 4. In Comparative Example 1, the water absorption property is poor and a good curl-extinguishing property cannot be obtained. In Comparative Example 2, the curl-extinguishing property is relatively good. However, the thermo-dimensional stability is insufficient, and a low grade polymer was deposited by aging and the transparency deteriorated. In Comparative Example 3, the curl-extinguishing property and the thermo-dimensional stability are both insufficient. In contrast, in Examples 1 to 11, films whose transparency, mechanical properties, thermo-dimensional stability and curl-extinguishing property are all excellent were obtained. For example, in Examples 5, 6, 7 and 9, the transparency does not deteriorate even after aging, and in Example 9, excellent dimensional stability and mechanical properties could be obtained. These films are very useful as a base film for a photosensitive material.

TABLE 1

|  | Example 1 | Example 2 | Example 3 | Example 4 |
|---|---|---|---|---|
| Glass transition | 64 | 65 | 66 | 100 |

TABLE 1-continued

|  | Example 1 | Example 2 | Example 3 | Example 4 |
|---|---|---|---|---|
| temperature (°C.) |  |  |  |  |
| Haze (%) | 1.0 | 2.2 | 1.5 | 1.0 |
| Haze (%) (40° C., 90% RH, two weeks after) | 2.5 | 3.5 | 3.0 | 2.5 |
| Heat shrinkage (%) | 1.4 | 2.0 | 1.6 | 1.4 |
| Tear resistance (g/mm) | 800 | 850 | 750 | 700 |
| Young's modulus after water absorption (kg/mm$^2$) | 280 | 310 | 290 | 450 |
| Strength at break (kg/mm$^2$) | 15.4 | 13.2 | 13.0 | 17.4 |
| Rate of increase in weight (%/30 min.) | 4.0 | 3.0 | 4.0 | 3.0 |
| Curl-extinguishing property | 5 | 4 | 5 | 4 |

TABLE 2

|  |  | Example 5 | Example 6 | Example 7 | Example 8 | Example 9 |
|---|---|---|---|---|---|---|
| Glass transition temperature (°C.) | A | 64 | 65 | 63 | 66 | 64 |
|  | B | 75 | 74 | 64 | 75 | 123 |
|  | C | — | — | — | — | 78 |
| Haze (%) |  | 1.0 | 2.2 | 2.2 | 1.5 | 1.2 |
| Haze (%) (40° C., 90% RH, two weeks after) |  | 1.1 | 2.5 | 2.5 | 3.0 | 1.7 |
| Heat shrinkage (%) |  | 1.4 | 2.0 | 1.9 | 1.6 | 0.8 |
| Tear resistance (g/mm) |  | 950 | 900 | 900 | 850 | 800 |
| Young's modulus after water absorption (kg/mm$^2$) |  | 410 | 400 | 400 | 410 | 480 |
| Strength at break (kg/mm$^2$) |  | 18.4 | 16.2 | 18.2 | 15.5 | 18.0 |
| Rate of increase in weight (%/30 min.) |  | 2.0 | 3.5 | 4.0 | 4.5 | 3.5 |
| Curl-extinguishing property |  | 4 | 5 | 5 | 5 | 4 |

TABLE 3

|  | Example 10 | Example 11 |
|---|---|---|
| Glass transition temperature (°C.) | 64 | 64 |
| Haze (%) | 1.2 | 1.0 |
| Haze (%) (40° C., 90% RH, two weeks after) | 1.5 | 2.5 |
| Heat shrinkage (%) | 2.0 | 1.6 |
| Tear resistance (g/mm) | 800 | 850 |
| Young's modulus after water absorption (kg/mm$^2$) | 280 | 320 |
| Strength at break (kg/mm$^2$) | 13.2 | 16.0 |
| Rate of increase in weight (%/30 min.) | 4.2 | 3.9 |
| Curl-extinguishing property | 5 | 5 |

TABLE 4

|  | Comparative Example 1 | Comparative Example 2 | Comparative Example 3 | TAC film |
|---|---|---|---|---|
| Glass transition temperature (°C.) | 75 | 61 | 63 | 120 |
| Haze (%) | 1.0 | 1.8 | 1.3 | 0.5 |

TABLE 4-continued

|  | Comparative Example 1 | Comparative Example 2 | Comparative Example 3 | TAC film |
|---|---|---|---|---|
| Haze (%) | 1.2 | 5.2 | 2.0 | 0.8 |
| (40° C., 90% RH, two weeks after) |  |  |  |  |
| Heat shrinkage (%) | 1.2 | 3.5 | 4.5 | 2.0 |
| Tear resistance (g/mm) | 900 | 950 | 800 | 230 |
| Young's modulus after water absorption (kg/mm$^2$) | 420 | 250 | 320 | 320 |
| Strength at break (kg/mm$^2$) | 22.0 | 13.1 | 14.3 | 8.0 |
| Rate of increase in weight (%/30 min.) | 0.3 | 2.5 | 0.8 | 4.5 |
| Curl-extinguishing property | 1 | 4 | 3 | 5 |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A polyester film comprising a polyester whose dicarboxylic acid copolymerized component contains:

an aromatic dicarboxylic acid having a metal sulfonate and/or a derivative thereof; and a polyetherdicarboxylic acid represented by chemical formula (a) and/or a derivative thereof and having a mean molecular weight in a range of 600 to 20,000, wherein said chemical formula (a) is $$R^1OOCCH_2-(O-R^2)_n-OCH_2COOR^3 \quad (a)$$

where, "$R^1$" and "$R^3$" are H or alkyl groups having a carbon number of 1 to 8, "$R^2$" is alkylene group having a carbon number of 2 to 8 and "n" is a positive integer of a value to provide said means molecular weight.

2. The polyester film according to claim 1, wherein said polyester contains said aromatic dicarboxylic acid and/or a derivative thereof in the range of 2 to 20% by weight and said polyetherdicarboxylic acid and/or a derivative thereof in the range of 2 to 20% by weight.

3. The polyester film according to claim 1, wherein said polyetherdicarboxylic acid is a polyethyleneoxydicarboxylic acid represented by the following chemical formula (b):

$$R^1OOCCH_2-(O-CH_2CH_2)_n-OCH_2COOR^2 \quad (b)$$

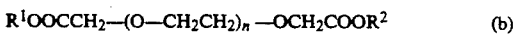

where, "$R^1$" and "$R^2$" are "H" or alkyl groups each having a carbon number of 1 to 8 and "n" is a positive integer.

4. The polyester film according to claim 1, wherein the glass transition temperature of said polyester film is not less than 50° C.

5. The polyester film according to claim 1, wherein the glass transition temperature of said polyester film determined after said polyester film is dipped in water is not higher than 60° C.

6. The polyester film according to claim 1, wherein said polyester film has a structure having a plurality of layers, and at least one of the plurality of layers is composed of said polyester.

7. The polyester film according to claim 6, wherein a layer composed of a polyester having a glass transition temperature of not less than 60° C., is laminated on at least one surface of said at least one layer composed of said polyester.

8. The polyester film according to claim 6, wherein said layer composed of said polyester is laminated on each surface of a layer composed of a polyester having a glass transition temperature of not less than 60° C.

9. The polyester film according to claim 1, wherein the rate of increase in weight of said polyester film determined after said polyester film is dipped in water for 30 minutes is not less than 1.5%.

10. The polyester film according to claim 1, wherein the tensile Young's modulus of said polyester film determined immediately after said polyester film is dipped in water is not less than 280 kg/mm$^2$.

11. The polyester film according to claim 1, wherein said polyester film is biaxially oriented.

12. The polyester film according to claim 11, wherein the haze of said polyester film is not greater than 5%.

13. The polyester film according to claim 11, wherein the heat shrinkage at 150° C., of said polyester film is not greater than 2%.

* * * * *

UNITED STATES PATENT AND TRADEMARK OFFICE
CERTIFICATE OF CORRECTION

PATENT NO. : 5,215,825
DATED : June 1, 1993
INVENTOR(S) : Toshihiko Hiraoka et al It is certified that error appears in the above-identified patent and that said Letters Patent is hereby corrected as shown below:

Column 2, line 51, after "are" insert --H or--.

Column 3, line 45, after "are" insert --H or--.

Signed and Sealed this

Eleventh Day of January, 1994

Attest:

BRUCE LEHMAN

Attesting Officer    Commissioner of Patents and Trademarks